(No Model.)
W. L. HORNE.
APPARATUS FOR PRODUCING A VACUUM.
No. 372,069. Patented Oct. 25, 1887.
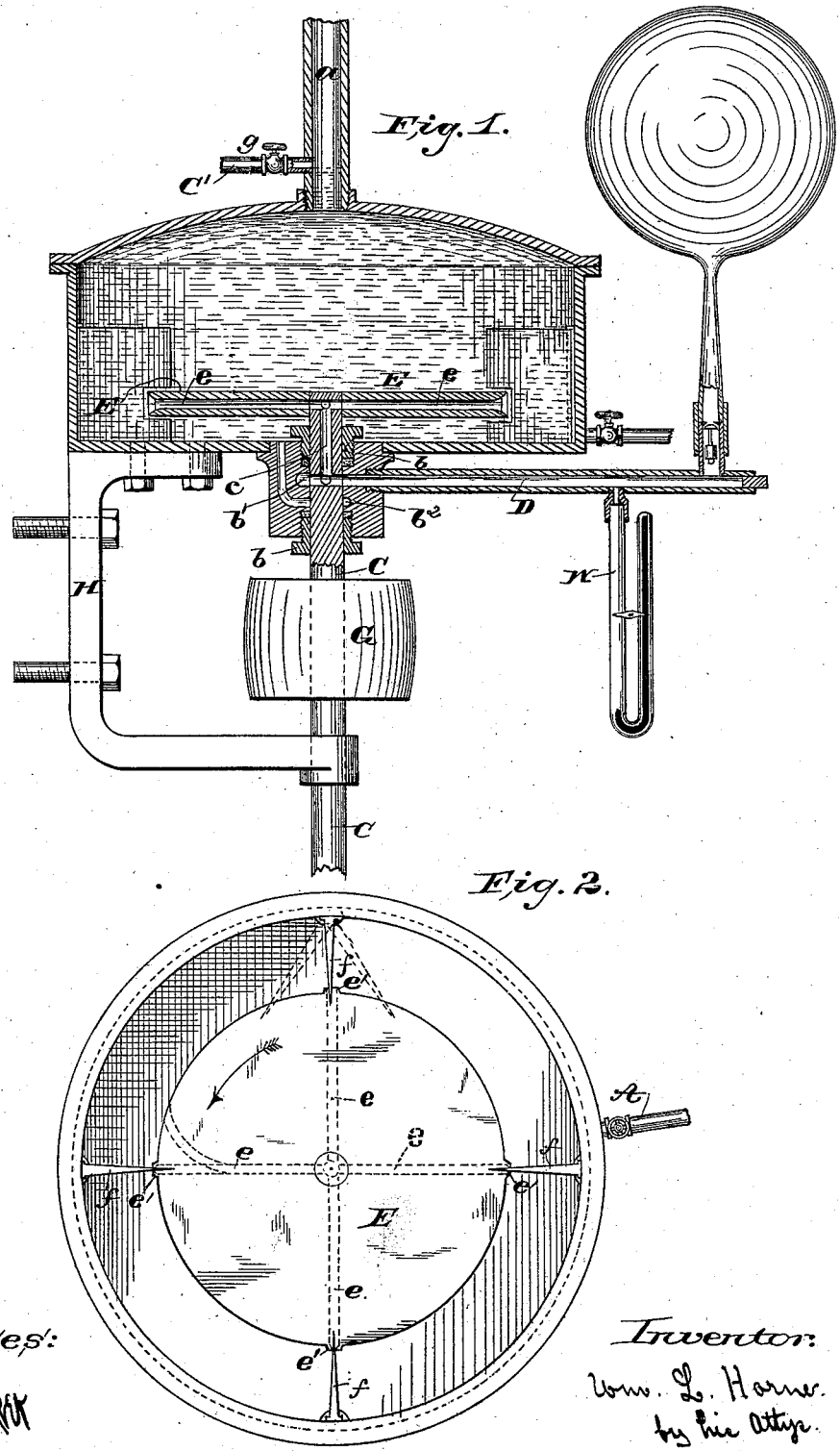

UNITED STATES PATENT OFFICE.

WILLIAM LEWIS HORNE, OF MERIDEN, CONNECTICUT.

APPARATUS FOR PRODUCING A VACUUM.

SPECIFICATION forming part of Letters Patent No. 372,069, dated October 25, 1887.

Application filed September 13, 1886. Serial No. 213,471. (No model.)

*To all whom it may concern:*

Be it known that I, WILLIAM LEWIS HORNE, a citizen of the United States, residing at Meriden, in the county of New Haven and State of Connecticut, have invented certain new and useful Improvements in the Process of and Apparatus for Producing Vacuums; and I do hereby declare the following to be a full, clear, and exact description of the invention, such as will enable others skilled in the art to which it appertains to make and use the same.

In my application No. 211,753, filed August 24, 1886, I have shown an apparatus for obtaining a vacuum by the use of a current of liquid, and have described the same therein and the mode of procedure used to obtain a vacuum by such means.

While my said invention affords a means for obtaining a vacuum where there is a system of water-distribution, or where there is a source of supply at a sufficient elevation, where it is necessary to raise the liquid employed to secure the necessary pressure, pumps are required to accomplish this, and the expenses of apparatus are greatly increased.

To provide a simpler apparatus for vacuum purposes where there is not a ready means of supply is the object of my present invention, which differs from that above referred to in that it consists in an apparatus and a mode of procedure for obtaining a vacuum by the use of a stationary body of liquid. I have herein described one form of apparatus devised by me for accomplishing that purpose, and have particularly pointed out my invention in the accompanying claims.

In the drawings, Figure 1 is a vertical sectional view of my said apparatus with an incandescent lamp-globe connected therewith. Fig. 2 is a plan view of my apparatus with the cover removed.

A is a liquid-reservoir. In the bottom of this reservoir is placed a hub, B, through which passes the shaft C. The hub is provided with stuffing-boxes $b$ $b$, which prevent the escape of liquid from the reservoir. The hub B is also provided with a liquid packing, which is provided by a groove, $b''$, in the hub connected with the reservoir A. The hub B is also provided with a groove, $b'$, surrounding the shaft C, which communicates with a pipe, D, to which is connected the lamp-globe or other articles to be exhausted of air.

The top of shaft C is provided with a central longitudinal recess or passage, $c$, which communicates with the groove $b'$ in the hub B by passages through the sides of shaft C. To the top of the shaft C is attached a horizontal disk, E, which is provided with narrow passages $e$, extending from the center of said disk to the periphery. At the center these passages connect with passages through the walls of the shaft opening into the recess or passage $c$ within the same, and at the periphery they terminate in narrow vertical openings.

The construction just described, it will be seen, forms a passage for air from the pipe D to the edge of disk E. The openings in the periphery of this disk are surrounded with slight projections $e'$, having inclined sides. Straight or curved radial tubular arms may be employed, but the employment of the disk lessens friction.

Power may be applied to shaft C to rotate the same by means of a hand-pulley, G, as shown, or in any other desired manner.

The reservoir may be open at the top; but I prefer to provide the same with a cover, C', and attach thereto an eduction-pipe, $a$, and it is filled with the liquid employed to about the point shown. This construction permits me to use mercury as the liquid, as the fumes are carried out through the pipe $a$ and injury to the operator prevented.

The reservoir and its attachments may be supported in any desired manner. I have shown as a means of support the bracket H, which is rigidly secured to the bottom of the reservoir and may be bolted to any suitable supporting structure or standard.

In operating the device the receptacle to be exhausted is attached to the pipe D and the shaft C set in motion and rapidly rotated. This results in the formation of a very perfect vacuum in pipe D and the connected receptacle. In order to prevent the liquid in the reservoir A from being rotated with the disk E, I provide the partial division or wings $f$, which in this instance extend inward beyond the periphery of the disk and are notched to receive the edge of the disk. These partitions may be of greater number and may extend to the center, if desired. They may also be set at such different angles as may be desired. While these wings or divisions are advantageous, they are not essential, and may be dispensed with.

While I have shown the disk E provided with four radial passages e, it may have less or more, as may be found advisable. The disk in this instance may be revolved in either direction, but when rotating in but one direction the passages e may be curved instead of straight, as shown in dotted lines in Fig. 2, in which case the disk must be rotated in the direction shown by the dotted arrow. In case the passages are curved the slight projections about the mouth of the same may be dispensed with.

W is a gage for determining when a vacuum is reached in pipe D.

In using water as the liquid it sometimes becomes very much aerated, and it is desirable to change the liquid by admitting fresh water at the bottom and drawing off the aerated portion at the top. This may be accomplished by means of pipes g. (Shown in the drawings.)

The passages in the disk E need not be exactly at right angles to the shaft C. They may be made to incline upward from the center in either straight or curved lines. The disk or its equivalent may be placed in other than a horizontal position.

Between the pipe D and the receptacle to be exhausted I place a float and check-valve, so that on the stoppage of the shaft C the liquid rushing into the passage and pipe D will close the valve and the vacuum be maintained in the receptacle as long as may be desired.

I do not limit myself to my exact construction, as various changes in the structure can be made without departing from my invention. For example, the disk E may be stationary and the reservoir rotated.

The passage c may continue farther in the shaft C, and the groove b and connection with pipe D may be in another bearing of the shaft, or the connection with such pipe may be at the end of the shaft.

What I claim, and desire to secure by Letters Patent, is—

1. A vacuum-pump consisting of a liquid-receptacle communicating freely with the open air, having a passage extending into and opening within the same, the end of the passage within the receptacle being adapted to be sealed by the liquid therein in constant communication with the receptacle and capable of movement within the same, substantially as described.

2. A vacuum-pump consisting of a liquid-receptacle having a free communication with the open air, in combination with a shaft extending into the same and provided with passages extending laterally therefrom, the outer ends of said passages being open and in constant communication with the liquid-receptacle, but adapted to be sealed by the liquid therein, and the said shaft having a passage connecting with said lateral passages and extending outside of the said liquid-receptacle, substantially as described.

3. A vacuum-pump consisting of the combination of a liquid-receptacle having a free communication with the open air, with a shaft extending into the same, and a disk mounted on said shaft within the receptacle, the said disk being provided with radial passages open at their outer ends and in constant communication with the said receptacle, but adapted to be sealed by the liquid therein, and the said shaft having a passage communicating with the radial passages of the disk and extending outside of the receptacle, substantially as described.

4. A vacuum-pump consisting of the combination, with a liquid-receptacle communicating with the open air, of a shaft extending within the same, a disk provided with radial passages mounted on said shaft within the receptacle, but adapted to be sealed by the liquid therein, and wings extending from the sides of the receptacle to the edge of the disk, the said shaft being provided with a passage connecting with the passages of the disk and extending outside of the receptacle, substantially as described.

5. A vacuum-pump consisting of the combination, with a liquid-receptacle having a free communication with the open air, of a shaft extending within the same, a disk provided with radial passages mounted on the shaft within the receptacle and adapted to be sealed by the liquid therein, and notched wings extending from the sides of the receptacle to the edge of the disk above and below the same, the said shaft being provided with a passage connecting with the radial passages of the disk and extending outside of the receptacle, substantially as described.

6. A vacuum-pump consisting of a liquid-receptacle having free communication with the open air, in combination with a shaft extending into the same, a disk provided with radial passages open at their ends and in constant communication with the receptacle and adapted to be sealed by the liquid therein, the said disk being provided with slight projections around the open ends of said passages, and the said shaft provided with a passage connecting with the radial passages of the disk and extending outside of the receptacle, substantially as described.

7. The combination, with a liquid-receptacle, of a rotary air-exhausting device within said receptacle, a passage connecting the air-exhausting device and the vessel to be exhausted, the said passage being below the level of the liquid within the receptacle, and a check-valve in the said passage between the exhausting device and the said vessel, substantially as described.

In testimony whereof I affix my signature in presence of two witnesses.

WM. LEWIS HORNE.

Witnesses:
EDWARD T. WALKER,
E. L. WHITE.